(12) United States Patent
Itou et al.

(10) Patent No.: US 11,555,099 B2
(45) Date of Patent: Jan. 17, 2023

(54) METHOD FOR PRODUCING COLORABLE MATERIAL

(71) Applicant: TOSHIBA TEC KABUSHIKI KAISHA, Tokyo (JP)

(72) Inventors: Tsuyoshi Itou, Izunokuni Shizuoka (JP); Maiko Miyoshi, Izunokuni Shizuoka (JP); Takafumi Hara, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 17/316,439

(22) Filed: May 10, 2021

(65) Prior Publication Data

US 2022/0049067 A1 Feb. 17, 2022

(30) Foreign Application Priority Data

Aug. 14, 2020 (JP) .............................. JP2020-136966

(51) Int. Cl.
| | |
|---|---|
| *C08K 5/18* | (2006.01) |
| *C09D 11/104* | (2014.01) |
| *C08K 5/053* | (2006.01) |
| *C08K 5/134* | (2006.01) |
| *C08K 3/36* | (2006.01) |

(52) U.S. Cl.
CPC .................. *C08K 5/18* (2013.01); *C08K 3/36* (2013.01); *C08K 5/053* (2013.01); *C08K 5/134* (2013.01); *C09D 11/104* (2013.01)

(58) Field of Classification Search
CPC ............. C08K 5/053; C08K 3/36; C08K 5/18
See application file for complete search history.

(56) References Cited

U.S. PATENT DOCUMENTS

| | | |
|---|---|---|
| 4,642,662 A | 2/1987 | Torii et al. |
| 2011/0183248 A1 | 7/2011 | Kabai et al. |
| 2011/0212397 A1 | 9/2011 | Aoki et al. |
| 2011/0287355 A1 | 11/2011 | Udo |
| 2012/0141932 A1 | 6/2012 | Yamauchi |

FOREIGN PATENT DOCUMENTS

| | | |
|---|---|---|
| JP | 2005-199554 A | 7/2005 |
| JP | 2008-239904 A | 10/2008 |
| JP | 2011-140155 A | 7/2011 |
| JP | 2016-117863 A | 6/2016 |
| JP | 2017-082142 A | 5/2017 |

OTHER PUBLICATIONS

Machine translation of Yokota (JP2011140155) (Year: 2011).*

* cited by examiner

*Primary Examiner* — Wenwen Cai
(74) *Attorney, Agent, or Firm* — Foley & Lardner LLP

(57) ABSTRACT

According to one embodiment, a high-definition and decolorable image is formed. A method for producing a colorable material according to an embodiment includes supplying a first solution containing a color developable agent and a first solvent to a color developing agent in the form of a powder which is insoluble in the first solvent so that a first mixture of the first solution and the color developing agent maintains the powder state, and removing the first solvent from the first mixture, thereby obtaining a powder of colorable particles containing the color developable agent and the color developing agent.

15 Claims, 8 Drawing Sheets

METHOD FOR PRODUCING COLORABLE MATERIAL

CROSS-REFERENCE TO RELATED APPLICATION

This application is based upon and claims the benefit of priority from Japanese Patent Application No. 2020-136966, filed on Aug. 14, 2020 the entire contents of which are incorporated herein by reference.

FIELD

Embodiments described herein relate generally to a method for producing a colorable material.

BACKGROUND

There is a technique for reusing a recording medium such as a paper by erasing an image formed thereon. Such a technique is very effective in terms of environmental protection and economic efficiency due to reduction in the used amount of the recording medium.

There are various methods for decoloring an image. Among these, many methods use a leuco dye as a color developable agent.

DETAILED DESCRIPTION

An object to be achieved by embodiments is to enable the formation of a high-definition and decolorable image.

According to an embodiment, a method for producing a colorable material including supplying a first solution containing a color developable agent and a first solvent to a color developing agent in the form of a powder which is insoluble in the first solvent so that a first mixture of the first solution and the color developing agent maintains the powder state, and removing the first solvent from the first mixture, thereby obtaining a powder of colorable particles containing the color developable agent and the color developing agent is provided.

According to another embodiment, a method for producing a colorable material including supplying a solution containing a thermoplastic resin and a solvent to colorable particles in the form of a powder containing a color developable agent and a color developing agent so that a mixture of the solution and the colorable particles maintains the powder state, and removing the solvent from the mixture is provided.

Hereinafter, the embodiments are described.

[1] Colorable Material

First, a colorable material that can be produced by a method according to an embodiment is described with reference to FIG. 1.

Figure 1:
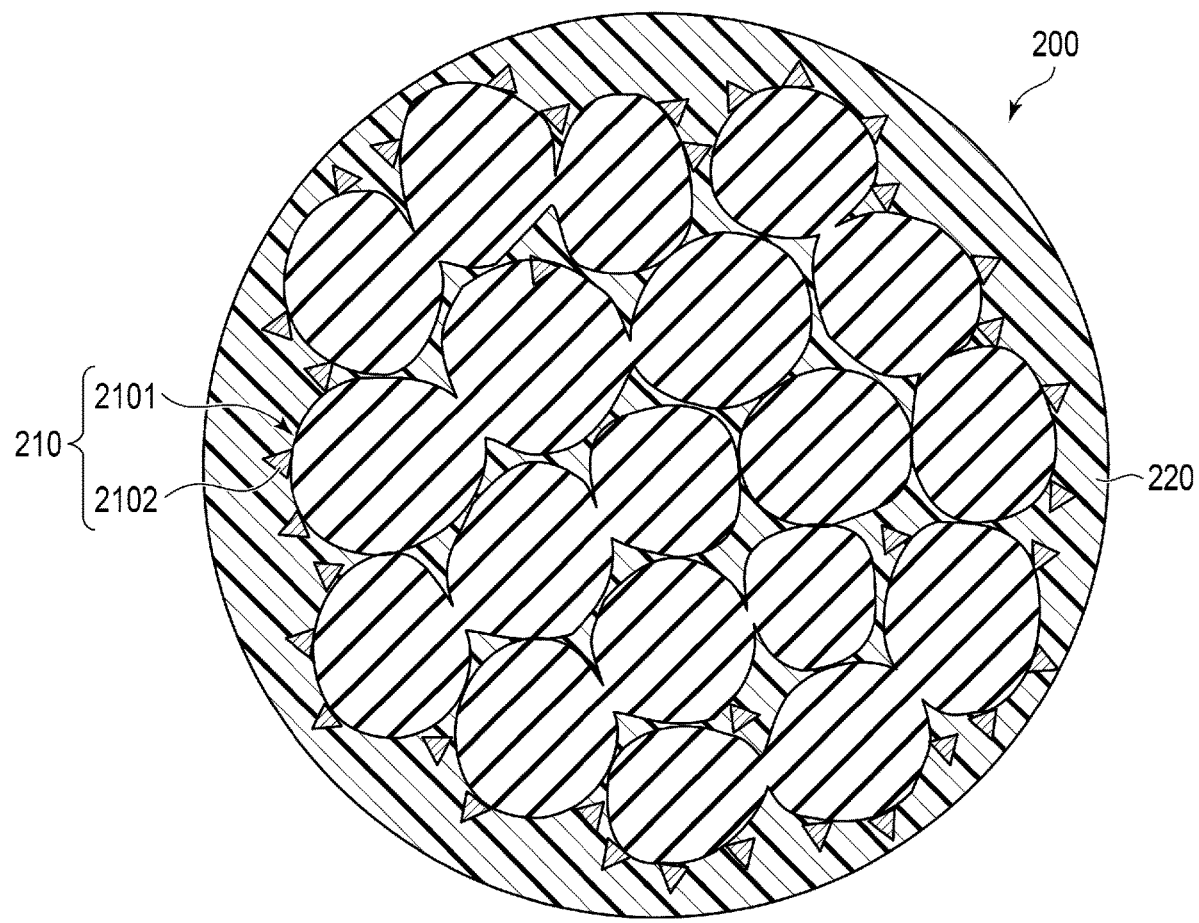
FIG. 1 is a cross-sectional view showing one example of a colorable material that can be produced by a method according to an embodiment.

As shown in FIG. 1, a colorable material 200 that can be produced by the method according to the embodiment contains colorable particles 210 and a thermoplastic resin 220. The colorable material 200 has a core-shell structure including the colorable particles 210 and the thermoplastic resin 220 as a core and a shell, respectively.

The average particle diameter of the colorable material 200 is preferably within a range from 0.05 to 20 μm, and more preferably within a range from 0.1 to 10 μm. Here, the "average particle diameter" is a value obtained by a laser diffraction scattering method. The colorable material 200 having a small average particle diameter is advantageous in forming a high-definition image.

[1.1] Colorable Particle

The colorable particle 210 includes a porous particle 2101 as a color developing agent and a color developable agent 2102 as shown in FIG. 1.

[1.1.1] Color Developing Agent

The color developing agent causes the color developable agent 2102 to develop a color. Here, the color developing agent is the porous particle 2101. The color developing agent need not be the porous particle 2101.

The porous particle 2101 is composed of an inorganic oxide. The inorganic oxide may be a nonmetal oxide such as silica, or a metal oxide such as titania or alumina, or a combination thereof. For example, as the porous particle 2101, silica, titania, alumina, strontium titanate, tin oxide, zirconium dioxide, zinc dioxide, zeolite, acid clay, activated clay, attapulgite, bentonite, aluminum silicate, magnesium silicate, zinc silicate, tin silicate, calcined kaolin, talc, and the like can be used by itself or two or more types can be mixed and used.

The porous particle 2101 is preferably an electron-accepting substance. According to one example, when the color developable agent 2102 is bound to the surface of the porous particle 2101, an electron is donated to the porous particle 2101 from the color developable agent 2102, and as a result, the color developable agent 2102 develops a color.

The porous particle 2101 is preferably silica, and more preferably active silica. Here, the "active silica" means silica having a large surface area and also having high reactivity attributed to a hydroxy group (silanol group) on the surface of silica.

Active silica has excellent thermal stability and is easily obtained as a small particle. Therefore, when active silica is used as the porous particle 2101, the particle size of the colorable particle 210 can be reduced. Therefore, use of active silica as the porous particle 2101 is advantageous in forming a high-definition image. Further, such a color developing agent has high affinity for a hydrophilic substance, and therefore has particularly excellent reactivity with the below-mentioned decolorable agent.

Specific examples of active silica include VP SG40 (40 $m^2/g$) and AEROSIL (registered trademark) OX50 (50 $m^2/g$), 50 (50 $m^2/g$), 90G (90 $m^2/g$), 130 (130 $m^2/g$), 200 (200 $m^2/g$), 300 (300 $m^2/g$), and 380S (380 $m^2/g$) manufactured by Nippon Aerosil Co., Ltd.; REOLOSIL (registered trademark) QS-10 (140 $m^2/g$), QS-20 (220 $m^2/g$), QS-30 (300 $m^2/g$), and QS-40 (380 $m^2/g$), SANSIL (registered trademark) series, and SILFIL (registered trademark) series manufactured by Tokuyama Corporation; CAB-O-SIL (registered trademark) fumed silica HS-5, MS-5, and MS-7 manufactured by Cabot Corporation; Nipsil (registered trademark) series such as Nipsil (registered trademark) LP, and NIPGEL (registered trademark) series manufactured by Tosoh Silica Corporation; SUNSPHERE (registered trademark) H-31 (800 $m^2/g$), H-51 (800 $m^2/g$), H-121 (800 $m^2/g$), H-201 (800 $m^2/g$), H-32 (700 $m^2/g$), H-52 (700 $m^2/g$), H-122 (700 $m^2/g$), H-33 (700 $m^2/g$), H-53 (700 $m^2/g$), L-31 (300 $m^2/g$), and L-51 (300 $m^2/g$) manufactured by AGC Si-Tech Co., Ltd.; SB-300 (300 $m^2/g$), SB-700 (700 $m^2/g$), and SB-705 (600 $m^2/g$) manufactured by Miyoshi Kasei, Inc.; and Sylysia (registered trademark) 250 (280 $m^2/g$), 310P (300 $m^2/g$), 320 (300 $m^2/g$), 420 (350 $m^2/g$), 530 (500 $m^2/g$), and 710 (700 $m^2/g$) manufactured by Fuji Silysia Chemical, Ltd. The value in the parentheses represents the below-mentioned BET specific surface area.

The specific surface area determined by the Brunauer, Emmett and Teller (BET) method, that is, the BET specific surface area of the porous particle 2101 is preferably 50 $m^2/g$ or more, and more preferably within a range from 200 to 750 $m^2/g$. A larger BET specific surface area is advantageous in achieving a high image density. However, when the BET specific surface area is excessively increased, the image density after decoloration may be high.

The porous particle 2101 may be or may not be a secondary particle obtained by aggregating primary particles. Preferably, the porous particle 2101 is a secondary particle having a three-dimensional structure obtained by aggregating primary particles having an average particle diameter of 10 nm or less. Here, the "average particle diameter" of the primary particles is a value obtained by an electron microscopic image analysis.

The average particle diameter of the porous particle 2101 is preferably within a range from 40 nm to 10 μm, and more preferably within a range from 50 nm to 5 μm. Here, the "average particle diameter" of the porous particle is a value obtained by a laser diffraction scattering method. When the average particle diameter is large, a large specific surface area may not be obtained. When the average particle diameter is too small, firm aggregation may occur.

[1.1.2] Color Developable Agent

The color developable agent 2102 is carried on the porous particle 2101. According to one example, the color developable agent 2102 is adsorbed onto the porous particle 2101. The color developable agent 2102 develops a color by the action of the porous particle 2101.

The color developable agent 2102 is, for example, an electron-donating color developable compound. As the color developable compound, for example, an electron-donating organic substance such as a leuco dye, specifically, a leucoauramine, a rhodamine B lactam, an indoline, a spiropyran, or a fluoran can be used. Further, examples of such a color developable compound include diphenylmethane phthalides, phenylindolyl phthalides, indolyl phthalides, diphenylmethane azaphthalides, phenylindolyl azaphthalides, fluorans, styrynoquinolines, and diaza-rhodamine lactones. Further, additional examples of such a color developable compound can include pyridine-based compounds, quinazoline-based compounds, and bisquinazoline-based compounds.

Specific examples of the color developable compound include 3,3-bis(p-dimethylaminophenyl)-6-dimethylaminophthalide (crystal violet lactone: CVL), malachite green lactone,
2-anilino-6-(N-cyclohexyl-N-methylamino)-3-methylfluoran,
2-anilino-3-methyl-6-(N-methyl-N-propylamino)fluoran,
3-[4-(4-phenylaminophenyl)aminophenyl]amino-6-methyl-7-chlorofluoran,
2-anilino-6-(N-methyl-N-isobutylamino)-3-methylfluoran,
2-anilino-6-(dibutylamino)-3-methylfluoran,
3-chloro-6-(cyclohexylamino)fluoran,
2-chloro-6-(diethylamino)fluoran,
7-(N,N-dibenzylamino)-3-(N,N-diethylamino)fluoran,
3,6-bis(diethylamino)fluoran-γ-(4'-nitro)anilinolactam,
3-diethylaminobenzo[a]-fluoran,
3-diethylamino-6-methyl-7-aminofluoran,
3-diethylamino-7-xylidinofluoran,
3-(4-diethylamino-2-ethoxyphenyl)-3-(1-ethyl-2-methylindol-3-yl)-4-azaphthalide,
3-(4-diethylaminophenyl)-3-(1-ethyl-2-methylindol-3-yl) phthalide, 3-diethylamino-7-chloroanilinofluoran,
3-diethylamino-7,8-benzofluoran,
3,3-bis(1-n-butyl-2-methylindol-3-yl)phthalide,
3,6-dimethylethoxyfluoran,
3-diethylamino-6-methoxy-7-aminofluoran, DEPM, ATP, ETAC,
2-(2-chloroanilino)-6-dibutylaminofluoran, crystal violet carbinol, malachite green carbinol,
N-(2,3-dichlorophenyl)leucoauramine, N-benzoylauramine, rhodamine B lactam, N-acetylauramine, N-phenylauramine,
2-(phenyliminoethanedilidene)-3,3-dimethylindoline,
N-3,3-trimethylindolinobenzospiropyran,
8'-methoxy-N-3,3-trimethylindolinobenzospiropyran,
3-diethylamino-6-methyl-7-chlorofluoran,
3-diethylamino-7-methoxyfluoran,
3-diethylamino-6-benzyloxyfluoran,
1,2-benz-6-diethylaminofluoran,
3,6-di-p-toluidino-4,5-dimethylfluoran-phenylhydrazide-γ-lactam, 3-amino-5-methylfluoran, 3,6-diphenylaminofluoran,
3,6-dimethoxyfluoran, 3,6-di-n-butoxyfluoran,
2-methyl-6-(N-ethyl-N-p-tolylamino)fluoran,
2-N,N-dibenzylamino-6-diethylaminofluoran,
3-chloro-6-cyclohexylaminofluoran,
2-methyl-6-cyclohexylaminofluoran,
2-(2-chloroanilino)-6-di-n-butylaminofluoran,
2-(3-trifluoromethylanilino)-6-diethylaminofluoran,
2-(N-methylanilino)-6-(N-ethyl-N-p-tolylamino)fluoran,
1,3-dimethyl-6-diethylaminofluoran,
2-chloro-3-methyl-6-diethylaminofluoran,
2-anilino-3-methyl-6-diethylaminofluoran,
2-anilino-3-methyl-6-di-n-butylaminofluoran,
2-xylidino-3-methyl-6-diethylaminofluoran,
1,2-benz-6-diethylaminofluoran,
1,2-benz-6-(N-ethyl-N-isobutylamino)fluoran,
1,2-benz-6-(N-ethyl-N-isoamylamino)fluoran,
3,3-bis(2-ethoxy-4-diethylaminophenyl)-4-azaphthalide, 3-(2-ethoxy-4-diethylaminophenyl)-3-(1-ethyl-2-methylindol-3-yl)-4-azaphthalide, 3-[2-ethoxy-4-(N-ethylanilino)phenyl]-3-(1-ethyl-2-methylindol-3-yl)-4-azaphthalide, 2-(3-methoxy-4-dodecoxystyryl)quinolinespiro[5H-(1)benzopyrano(2,3-d)pyrimidine-5,1'(3'H)isobenzofuran]-3'-one, 2-(diethylamino)-8-(diethylamino)-4-methylspiro[5H-(1)benzopyrano(2,3-d)pyrimidine-5,1'(3'H)isobenzofuran]-3'-one, 2-(di-n-butylamino)-8-(di-n-butylamino)-4-methylspiro[5H-(1)benzopyrano(2,3-d)pyrimidine-5,1'(3'H)isobenzofuran]-3'-one, 2-(di-n-butylamino)-8-(diethylamino)-4-methylspiro[5H-(1)benzopyrano(2,3-d)pyrimidine-5,1'(3'H)isobenzofuran]-3'-one, 2-(di-n-butylamino)-8-(N-ethyl-N-i-amylamino)-4-methylspiro[5H-(1)benzopyrano(2,3-d)pyrimidine-5,1'(3'H)isobenzofuran]-3'-one, 2-(di-n-butylamino)-8-(di-n-butylamino)4-phenyl-3-(2-methoxy-4-dimethylaminophenyl)-3-(1-butyl-2-methylindol-3-yl)-4,5,6,7-tetrachlorophthalide, 3-(2-ethoxy-4-diethylaminophenyl)-3-(1-ethyl-2-methylindol-3-yl)-4,5,6,7-tetrachlorophthalide, and 3-(2-ethoxy-4-diethylaminophenyl)-3-(1-pentyl-2-methylindol-3-yl)-4,5,6,7-tetrachlorophthalide.

Examples of a commercially available color developable compound include RED 500, RED 520, CVL, S-205, BLACK 305, BLACK 400, ETAC, NIR BLACK 78, BLUE 220, H-3035, BLUE 203, GREEN 300, ATP, H-1046, and H-2114 manufactured by Yamada Chemical Co., Ltd., and ODB-4, Blue-63, Blue-502, GN-169, GN-2, Green-118, Red-40, and Red-8 manufactured by Yamamoto Chemicals, Inc.

These can be used by itself or two or more types can be mixed and used. By appropriately selecting the color developable compound, a state of being colored in various colors is obtained, and therefore, a multicolor can also be expressed.

The amount of the color developable agent 2102 is preferably within a range from 5 to 50 parts by mass, and more preferably within a range from 10 to 40 parts by mass with respect to 100 parts by mass of the porous particles 2101. A large amount of the color developable agent 2102 is advantageous in achieving a high image density. However, when the amount of the color developable agent 2102 is excessively increased, the image density after decoloration may be high.

[1.2] Thermoplastic Resin

The thermoplastic resin 220 coats the colorable particle 210. That is, the thermoplastic resin 220 constitutes a coating film for encapsulating the colorable particle 210. The thermoplastic resin 220 separates the decolorable agent from the color developable agent 2102 when the colorable particle 210 is in a colored state.

The thermoplastic resin 220 can be omitted. However, by coating the colorable particle 210 with the thermoplastic resin 220, undesirable decoloration of the colorable particle 210 can be made less likely to occur.

Specific examples of the thermoplastic resin include polyester; styrenic resins such as polystyrene, a styrene-butadiene copolymer, and a styrene-acrylic copolymer; ethylenic resins such as polyethylene, a polyethylene-vinyl acetate copolymer, a polyethylene-norbornene copolymer, and a polyethylene-vinyl alcohol copolymer; polyurethane-based resins; acrylic resins; phenolic resins; epoxy-based resins; allyl phthalate-based resins; polyamide-based resins; and maleic acid-based resins.

The glass transition temperature Tg of the thermoplastic resin is preferably within a range from 40 to 200° C., and more preferably within a range from 50 to 180° C. When the glass transition temperature Tg is low, decoloration may occur during formation or storage of an image. When the glass transition temperature Tg is high, a heat treatment for decoloration needs to be performed at a high temperature.

The amount of the thermoplastic resin is preferably within a range from 10 to 200 parts by mass, and more preferably within a range from 20 to 100 parts by mass with respect to 100 parts by mass of the colorable particles 210. When the amount of the thermoplastic resin is small, the colorable particles 210 may not be able to be sufficiently encapsulated. When the amount of the thermoplastic resin is increased, the image density after decoloration may be high.

[Decolorable Material]

A decolorable material according to an embodiment contains the above-mentioned colorable material and a decolorable agent.

The decolorable material is in a colored state immediately after production and is irreversibly decolored by being heated to a predetermined temperature or higher.

In more detail, in the decolorable material immediately after production, the color developable agent is bound to the surface of the porous particle and is in a colored state by the action of the porous particle that is the color developing agent. Further, in the decolorable material immediately after production, the thermoplastic resin separates the decolorable agent from the colorable particle, and does not prevent coloration of the color developable agent. Therefore, the decolorable material immediately after production is in a colored state.

When the decolorable material is heated to the glass transition temperature Tg of the thermoplastic resin or higher, the decolorable agent can come in contact with the porous particle. The decolorable agent after coming in contact with the porous particle binds to the porous particle. Thereby, the color developable agent bound to the surface of the porous particle is replaced with the decolorable agent. As a result, the action of the porous particle that is the color developing agent on the color developable agent becomes small, so that the color developable agent is decolored. In this manner, the decolorable material is decolored.

The decolorable material is, for example, a solid containing the colorable material and the decolorable agent. In that case, the decolorable material may be a powder such as a toner. When the decolorable material is a toner, the decolorable material can further contain another component generally contained in the toner, for example, an internal additive such as a binder resin, a release agent, or a charge control agent, or an external additive.

The decolorable material may be a liquid containing the colorable material and the decolorable agent. In that case, the decolorable material may be a dispersion liquid such as an ink. When the decolorable material is an ink such as an inkjet ink, the decolorable material can further contain another component generally contained in such an ink, for example, a dispersion medium, or an auxiliary agent such as a stabilizing agent, a viscosity adjusting agent, or a preservative.

[2.1] Colorable Material

The colorable material contained in the decolorable material is the same as the colorable material 200 described with reference to FIG. 1.

[2.2] Decolorable Agent

The decolorable agent is mixed with the colorable material. The decolorable agent may be or may not be carried by the colorable material.

The decolorable agent has a property of decoloring the above-mentioned color developable agent by heating to a predetermined temperature or higher. As the decolorable agent, a material having an ester group, a ketone group, a hydroxy group, an ether group, or an amide group can be used. Examples of the decolorable agent include a polyhydric alcohol, a nonionic surfactant, a cationic surfactant, and a hindered amine derivative.

The decolorable agent is preferably a polyhydric alcohol. That is, the decolorable agent is preferably an alcohol having two or more hydroxy groups in the molecule. The decolorable agent is more preferably an alcohol having three or more hydroxy groups in the molecule.

The polyhydric alcohol has higher affinity for the surface of the porous particle composed of an electron-accepting substance such as silica than an alcohol having only one hydroxy group in the molecule. Therefore, use of a polyhydric alcohol as the decolorable agent is advantageous in obtaining the decolorable material having an excellent decoloring ability.

As the polyhydric alcohol, for example, a sugar alcohol can be used. That is, the decolorable agent may be a polyhydric alcohol that does not have a cyclic structure in the molecular structure or may be a linear polyhydric alcohol. As the sugar alcohol, xylitol, D-sorbitol, or D-mannitol can be used.

As the decolorable agent, a polyhydric alcohol other than a sugar alcohol can also be used. As such a polyhydric alcohol, for example, trimethylolpropane can be used.

Preferred examples of the polyhydric alcohol include polyethylene glycol, polypropylene glycol, polybutylene glycol, ethylene glycol, propylene glycol, butylene glycol, glycerin, xylitol, trimethylolpropane, and ditrimethylolpropane.

As the nonionic surfactant, for example, a polyoxyethylene alkyl ether, a polyoxyalkylene alkyl ether, a polyoxyethylene derivative, a sorbitan fatty acid ester, a polyoxyethylene sorbitan fatty acid ester, a polyoxyethylene sorbitol fatty acid ester, a glycerin fatty acid ester, a polyoxyethylene fatty acid ester, a polyoxyethylene hydrogenated castor oil, a polyoxyethylene alkyl amine, or an alkyl alkanolamide can be used.

As the cationic surfactant, for example, an alkyl amine salt or an alkyl quaternary ammonium salt can be used.

As the hindered amine derivative, for example, tetrakis (1,2,2,6,6-pentamethyl-4-piperidyl)1,2,3,4-butanetetracarboxylate, tetrakis(2,2,6,6-tetramethyl-4-piperidyl) butane-1,2,3,4-butanetetracarboxylate, a condensate of 1,2,3,4-butanetetracarboxylic acid and 1,2,2,6,6-pentamethyl-4-piperidinol and $\beta,\beta,\beta,\beta$-tetramethyl-3,9-(2,4,6,8,10-tetraoxaspiro[5,5]undecane)diethanol, bis(2,2,6,6-tetramethyl-4-piperidyl)sebacate, or tetrakis(1,2,2,6,6-pentamethyl-4-piperidyl)1,2,3,4-butanetetracarboxylate can be used.

Examples of a commercially available hindered amine derivative include CHIMASSORB (registered trademark) 2020 FDL and 944 FDL, and TINUVIN (registered trademark) 622 LD, 144, 765, 770 DF, 111 FDL, 783 FDL, 783 FDL, and 791 FB (manufactured by BASF Japan Co., Ltd.); and ADEKA STAB (registered trademark) LA52, LA57, LA63P, LA77Y, LA68LD, LA77G, LA402XP, LA502XP, and ADEKA ARKLS (registered trademark) DN-44M (manufactured by Adeka Corporation).

Further, the decolorable agent known in JP-A-2000-19770 or the like can also be used. Examples thereof include cholesterol, stigmasterol, pregnenolone, methylandrostenediol, estradiol benzoate, epiandrostene, stenolone, $\beta$-sitosterol, pregnenolone acetate, $\beta$-chorestarol, 5,16-pregnadiene-3$\beta$-ol-20-one, 5$\alpha$-pregnen-3$\beta$-ol-20-one, 5-pregnen-3$\beta$, 17-diol-20-one-21-acetate, 5-pregnen-3$\beta$, 17-diol-20-one-17-acetate, 5-pregnen-3$\beta$, 21-diol-20-one-21-acetate, 5-pregnen-3$\beta$, 17-diol diacetate, rockogenin, thigogenin, esmiragenin, heckogenin, diosgenin, cholic acid, methyl cholate, sodium cholate, lithocholic acid, methyl lithocholate, sodium lithocholate, hydroxycholic acid, methyl hydroxycholate, hyodeoxycholic acid, methyl hyodeoxycholate, testosterone, methyltestosterone, 11$\alpha$-hydroxymethyltestosterone, hydrocortisone, cholesterol methyl carbonate, $\alpha$-cholestanol, D-glucose, D-mannose, D-galactose, D-fructose, L-sorbose, L-rhamnose, L-fucose, D-ribodesose, $\alpha$-D-glucose pentaacetate, acetoglucose, diacetone-D-glucose, D-glucuronic acid, D-galacturonic acid, D-glucosamine, D-fructosamine, D-isosaccharic acid, vitamin C, erutorubic acid, trehalose, saccharose, maltose, cellobiose, gentiobiose, lactose, melibiose, raffinose, gentianose, melezitose, stachyose, methyl $\alpha$-glucopyranoside, salicin, amygdalin, euxanthic acid, cyclododecanol, hexahydrosalicylic acid, menthol, isomenthol, neomenthol, neoisomenthol, carbomenthol, $\alpha$-carbomenthol, piperithol, $\alpha$-terpineol, $\beta$-terpineol, $\gamma$-terpineol, 1-p-menthene-4-ol, isopulegol, dihydrocarveol, carveol, 1,4-cyclohexanediol, 1,2-cyclohexanediol, phloroglucitol, quercitol, inositol, 1,2-cyclododecanediol, quinic acid, 1,4-terpene, 1,8-terpene, pinol hydrate, betulin, borneol, isoborneol, adamantanol, norborneol, fenchol, camphor, and 1,2:5,6-diisopropylidene-D-mannitol.

The amount of the decolorable agent is preferably within a range from 1 to 1000 parts by mass, and more preferably within a range from 3 to 500 parts by mass with respect to 100 parts by mass of the colorable particles.

[3] Method for Producing Colorable Material

Hereinafter, a method for producing the colorable material according to the embodiment is described.

In the production of the colorable material, first, the porous particles are made to carry the color developable agent, thereby obtaining colorable particles. The colorable particles can also be obtained by a wet method or a dry method.

In the wet method, first, a dispersion liquid containing the porous particles and a dispersion medium, and a solution containing the color developable agent and a solvent are prepared. As the dispersion medium and the solvent, for example, a volatile organic solvent such as acetone is used. Subsequently, the dispersion liquid and the solution are mixed. The dispersion medium and the solvent are removed from the resulting mixed liquid, thereby obtaining a solid material. Thereafter, the solid material is ground using, for example, a mixer. In this manner, the colorable particles are obtained.

The colorable particles are preferably obtained by, for example, a dry method described below.

In the dry method, first, a first solution containing the color developable agent and a first solvent is supplied to the color developing agent in the form of a powder which is insoluble in the first solvent so that a first mixture of the first solution and the color developing agent maintains the powder state.

Figure 2:
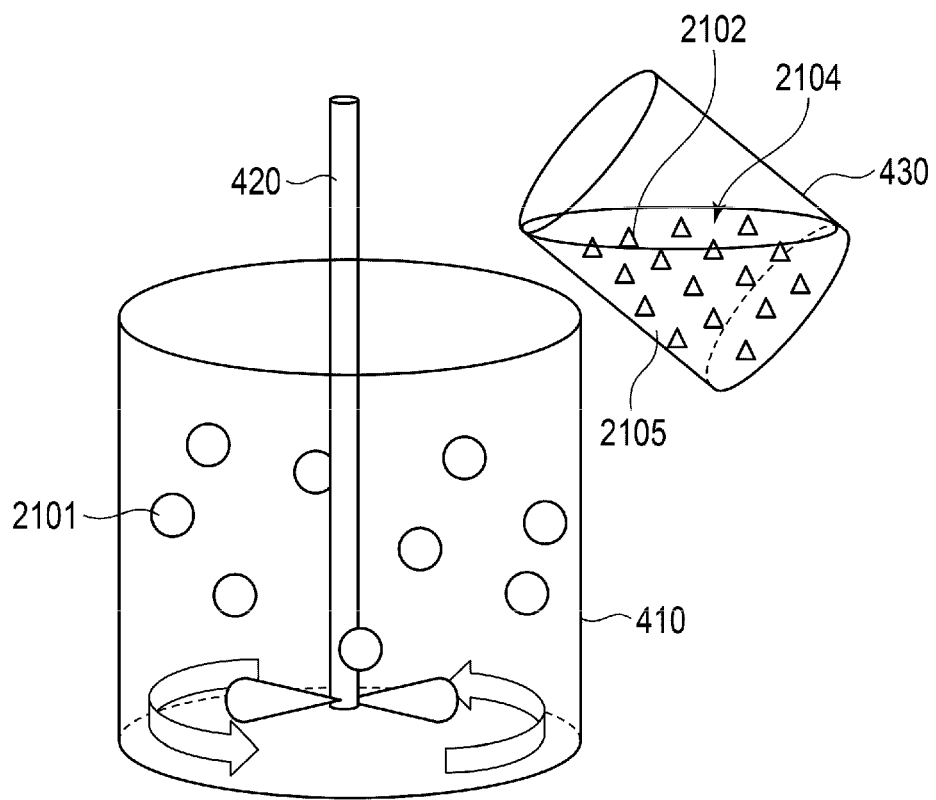
FIG. 2 is a diagram showing a first step in a method for producing a colorable material according to an embodiment.

For example, as shown in FIG. 2, the porous particles 2101 that are the color developing agent are fed to a processing container 410 and stirred using a stirring device 420. The porous particles 2101 are in the form of a powder, and therefore, by the stirring, the porous particles 2101 are fluidized in the processing container 410.

When as the porous particles 2101, particles having a large total pore volume and a small average particle diameter are used, by driving the stirring device 420 so as to rotate the stirring blade at a high speed, the porous particles 2101 are brought into, for example, a floating or dispersed state in an internal space of the processing container 410. The rotation speed of the stirring blade is set preferably within a range from 150 to 5,000 rpm, and more preferably within a range from 300 to 4,000 rpm when using a 2 L container as the processing container 410.

Subsequently, a first solution 2104 stored in a container 430 is supplied little by little to the fluidized porous particles 2101. Here, the first solution 2104 is a liquid containing the color developable agent 2102 and a first solvent 2105. The porous particle 2101 that is the color developing agent is insoluble in the first solvent 2105.

The first solvent 2105 is, for example, an organic solvent. The first solvent 2105 is preferably a volatile organic solvent such as acetone. Specific examples of the first solvent 2105 include alcohols such as methanol, ethanol, propanol, isopropanol, butanol, and isobutanol; glycols such as ethylene glycol, propylene glycol, diethylene glycol, and dipropylene glycol; monoalkyl ethers of glycols; dialkyl ethers of glycols; ketones such as acetone and methyl ethyl ketone; nitriles such as acetonitrile; ethers such as tetrahydrofuran; esters such as methyl acetate, dimethyl carbonate, and propylene carbonate; amides such as N-methylformamide and N,N-dimethylformamide; sulfoxides such as dimethyl sulfoxide; aromatic hydrocarbons such as toluene, xylene, and mesitylene; and mixed solvents thereof. The first solvent 2105 may further contain water as needed in addition to the organic solvent.

The concentration of the color developable agent 2102 in the first solution 2104 is preferably within a range from 1 to 50 mass %, and more preferably within a range from 2 to 30 mass %. When the concentration of the color developable agent 2102 is low, the necessity of supplying a large amount of the first solution 2104 to the porous particles 2101 occurs. When the concentration of the color developable agent 2102 is high, the color developable agent 2102 is not easily uniformly supplied to the porous particles 2101.

The supply of the first solution 2104 to the porous particles 2101 is performed preferably at a temperature within a range from 5 to 60° C., and more preferably at a temperature within a range from 10 to 50° C. When the temperature is high, drying proceeds rapidly, and therefore, the color developable agent 2102 is not easily uniformly carried on the porous particles 2101.

The supply of the first solution 2104 to the porous particles 2101 is preferably performed so that the porous particles 2101 maintain the powder state, that is, free liquid is not generated.

The supply of the first solution 2104 to the porous particles 2101 can be performed by, for example, adding the first solution 2104 dropwise little by little into the processing container 410. Alternatively, the supply of the first solution 2104 to the porous particles 2101 can be performed by spraying the first solution 2104 into the processing container 410.

The supply amount of the first solution 2104 per minute is set preferably within a range from 0.5 to 50 parts by mass, and more preferably within a range from 1 to 30 parts by mass with respect to 100 parts by mass of the porous particles 2101.

Figure 3:
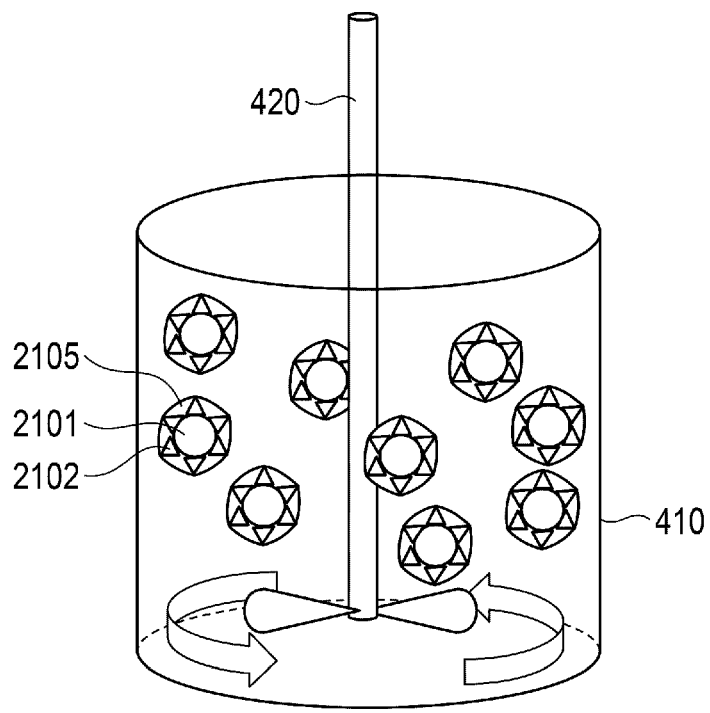
FIG. 3 is a diagram showing a state obtained by undergoing the step in FIG. 2.

The porous particles 2101 have a large specific surface area. Therefore, when the first solution 2104 is supplied as described above, the porous particles 2101 absorb the first solution 2104 without causing aggregation or heavy aggregation. As a result, as shown in FIG. 3, composite particles in which the porous particles 2101 carry the color developable agent 2102 and the first solvent 2105 are obtained. Each composite particle may contain only one porous particle 2101 or may contain a plurality of porous particles 2101.

Subsequently, the first solvent is removed from the first mixture containing the first solution and the color developing agent, thereby obtaining a powder of the colorable particles containing the color developable agent and the color developing agent.

Figure 4:
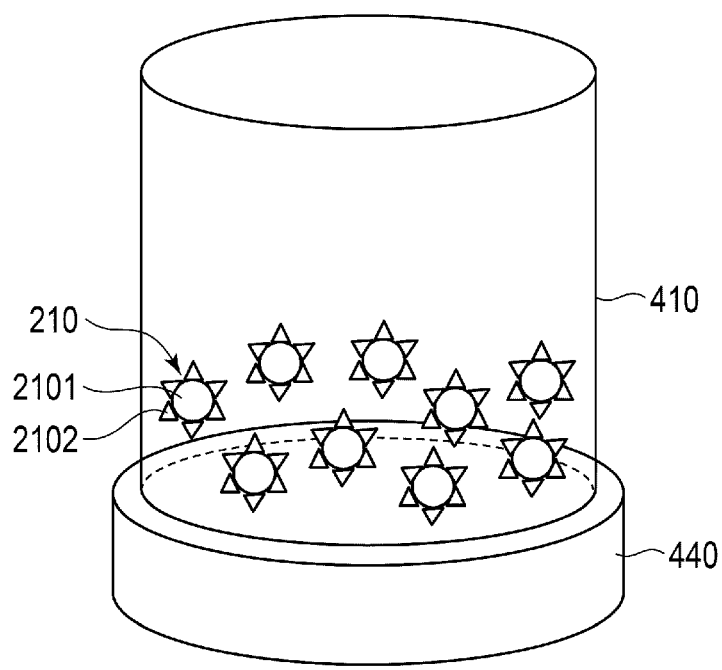
FIG. 4 is a diagram showing a second step in the method for producing a colorable material according to the embodiment.

For example, subsequently to the above-mentioned step, as shown in FIG. 4, the composite particles are dried with a heater 440. That is, the first solvent 2105 is removed from the composite particles. The drying step may be performed in a reduced pressure atmosphere.

As the heater 440, for example, a device that heats the processing container 410 such as a water bath or a jacket heater can be used. The drying of the composite particles is performed preferably at a temperature within a range from 40 to 90° C., and more preferably at a temperature within a range from 50 to 80° C.

In this manner, the colorable particles 210 are obtained. The drying step may be performed in a state where the composite particles are made to flow or in a state where the composite particles are made not to flow. Further, a series of process from supplying of the first solution 2104 to drying of the composite particles may be performed only once or may be repeated a plurality of times.

Subsequently, the colorable particles 210 are coated with the thermoplastic resin 220, thereby obtaining the colorable material 200 shown in FIG. 1. The colorable material 200 can also be obtained by a wet method or a dry method.

In the wet method, first, a dispersion liquid containing the colorable particles 210 and a dispersion medium, and a solution containing the thermoplastic resin and a solvent are prepared. As the dispersion medium and the solvent, for example, a volatile organic solvent such as acetone is used. Subsequently, the dispersion liquid and the solution are mixed. The dispersion medium and the solvent are removed from the resulting mixed liquid, thereby a solid material is obtained. Thereafter, the solid material is ground using, for example, a mixer. In this manner, the colorable material 200 is obtained.

The colorable material 200 is preferably obtained by, for example, a dry method described below.

In the dry method, first, a second solution containing the thermoplastic resin and a second solvent is supplied to the colorable particles in the form of a powder so that a second mixture of the second solution and the colorable particles maintains the powder state.

Figure 5:
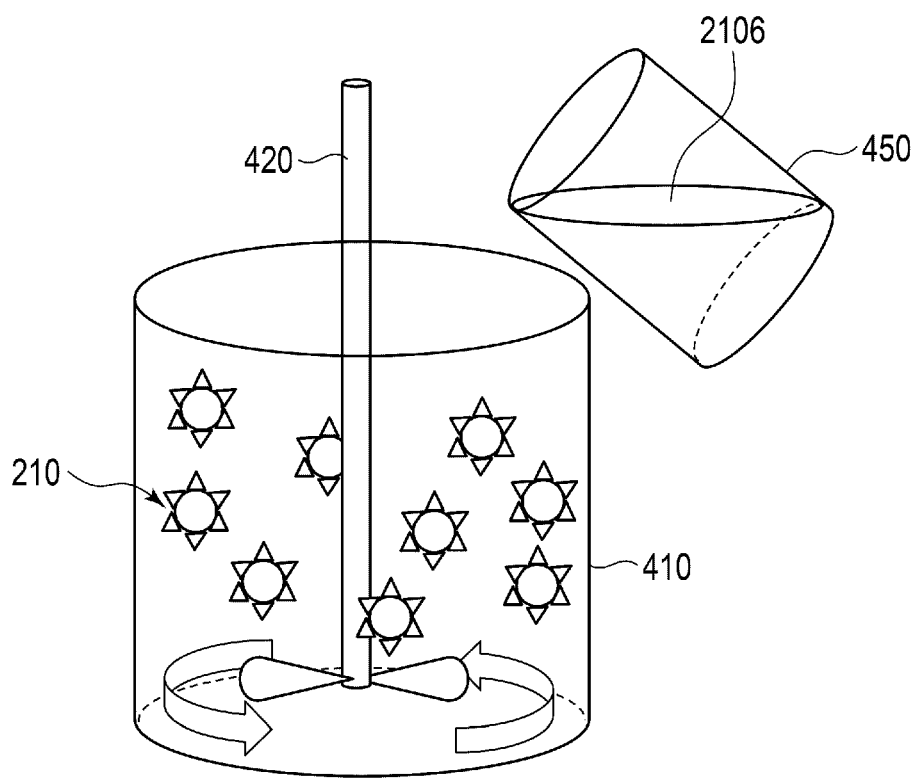
FIG. 5 is a diagram showing a third step in the method for producing a colorable material according to the embodiment.

For example, as shown in FIG. 5, the colorable particles 210 are fluidized in the processing container 410 using the stirring device 420. Here, the processing container 410 and the stirring device 420 used for obtaining the colorable particles 210 are used, however, a processing container and a stirring device different from these may be used.

When as the colorable particles 210, particles having a large total pore volume and a small average particle diameter are used, by driving the stirring device 420 so as to rotate the stirring blade at a high speed, the colorable particles 210 are brought into, for example, a floating or dispersed state in an internal space of the processing container 410. The rotation speed of the stirring blade is set preferably within a range from 150 to 5,000 rpm, and more preferably within a range from 300 to 4,000 rpm when the processing container 410 is a 2 L container.

Subsequently, a second solution 2106 stored in a container 450 is supplied little by little to the fluidized colorable particles 210. Here, the second solution 2106 is a liquid containing the above-mentioned thermoplastic resin and a second solvent.

The second solvent is, for example, an organic solvent. The solvent is preferably a volatile organic solvent such as acetone. Specific examples of the second solvent include alcohols such as methanol, ethanol, propanol, isopropanol, butanol, and isobutanol; glycols such as ethylene glycol, propylene glycol, diethylene glycol, and dipropylene glycol; monoalkyl ethers of glycols; dialkyl ethers of glycols; ketones such as acetone and methyl ethyl ketone; nitriles such as acetonitrile; ethers such as tetrahydrofuran; esters such as methyl acetate, dimethyl carbonate, and propylene carbonate; amides such as N-methylformamide and N,N-dimethylformamide; sulfoxides such as dimethyl sulfoxide; aromatic hydrocarbons such as toluene, xylene, and mesitylene; and mixed solvents thereof. The second solvent may further contain water as needed in addition to the organic solvent.

The concentration of the thermoplastic resin in the second solution 2106 is preferably within a range from 1 to 50 mass %, and more preferably within a range from 5 to 30 mass %. When the concentration of the thermoplastic resin is low, the necessity of supplying a large amount of the second solution 2106 to the colorable particles 210 occurs. When the concentration of the thermoplastic resin is high, the thermoplastic resin is not easily uniformly supplied to the colorable particles 210.

The supply of the second solution 2106 to the colorable particles 210 is performed preferably at a temperature within a range from 5 to 60° C., and more preferably at a temperature within a range from 10 to 50° C. When the temperature is high, drying proceeds rapidly, and therefore, the colorable particles 210 are not easily uniformly coated with the thermoplastic resin.

The supply of the second solution 2106 to the colorable particles 210 is preferably performed so that the colorable particles 210 maintain the powder state, that is, free liquid is not generated.

The supply of the second solution 2106 to the colorable particles 210 can be performed by, for example, adding the second solution 2106 dropwise little by little into the processing container 410. Alternatively, the supply of the second solution 2106 to the colorable particles 210 can be performed by spraying the second solution 2106 into the processing container 410.

The supply amount of the second solution 2106 per minute is set preferably within a range from 0.5 to 50 parts by mass, and more preferably within a range from 1 to 30 parts by mass with respect to 100 parts by mass of the colorable particles 210.

Figure 6:
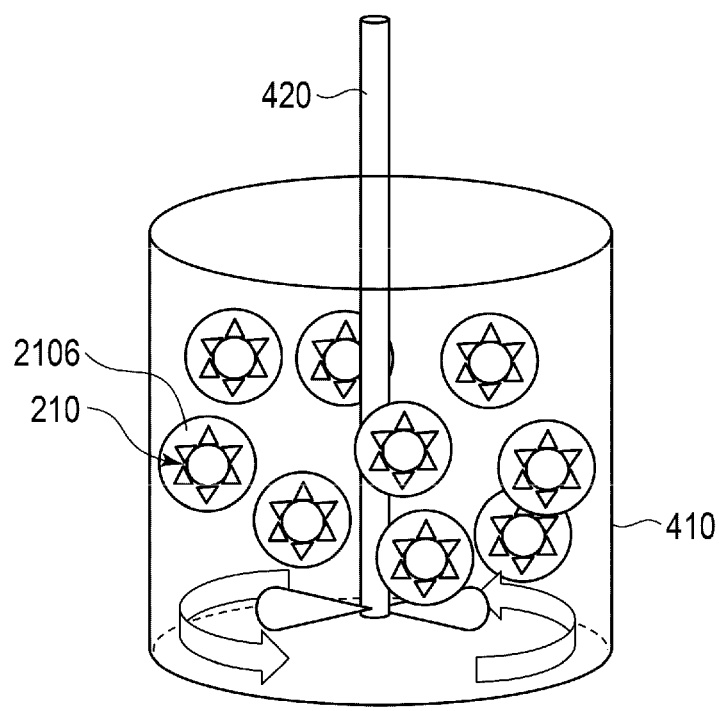
FIG. 6 is a diagram showing a state obtained by undergoing the step in FIG. 5.

The colorable particles 210 have a large specific surface area, although not so large as that of the porous particles 2101. Therefore, when the second solution 2106 is supplied as described above, the colorable particles 210 absorb the second solution 2106 without causing aggregation or heavy aggregation. As a result, as shown in FIG. 6, composite particles in which the colorable particles 210 carry the second solution 2106 are obtained. Each composite particle may contain only one colorable particle 210 or may contain a plurality of colorable particles 210.

Subsequently, the second solvent is removed from the second mixture.

Figure 7:
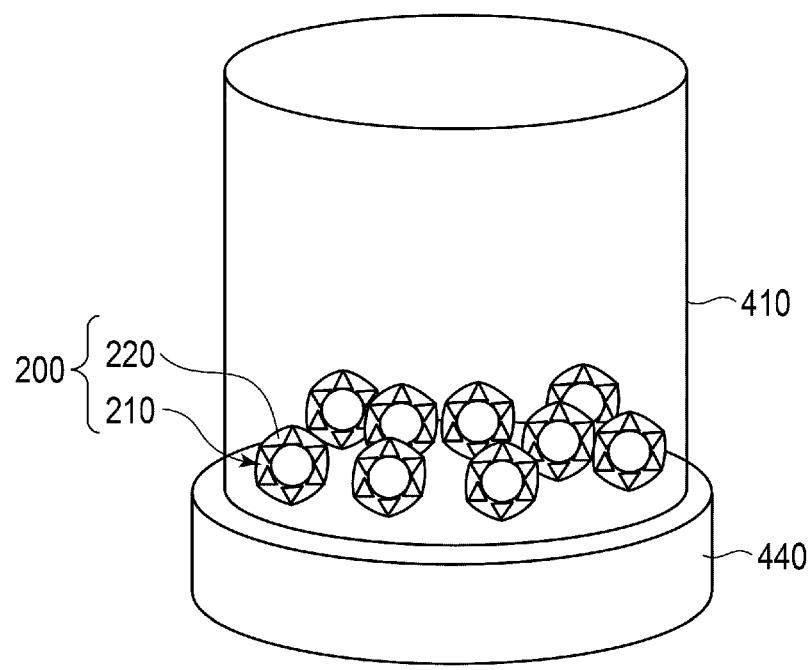
FIG. 7 is a diagram showing a fourth step in the method for producing a colorable material according to the embodiment.

For example, subsequently to the above-mentioned step, as shown in FIG. 7, the composite particles are dried with the heater 440. That is, the second solvent is removed from the composite particles. The drying of the composite particles is performed preferably at a temperature within a range from 40 to 90° C., and more preferably at a temperature within a range from 50 to 80° C.

In this manner, the colorable material 200 containing the colorable particles 210 and the thermoplastic resin 220 is obtained. Here, the heater 440 used for obtaining the colorable particles 210 is used, but a heater different from this may be used. The drying step may be performed in a state where the composite particles are made to flow or in a state where the composite particles are made not to flow. Further, a series of process from supplying of the second solution 2106 to drying of the composite particles may be performed only once or may be repeated a plurality of times.

[4] Method for Producing Decolorable Material

A method for producing the decolorable material according to the embodiment includes obtaining a mixture containing the above-mentioned colorable material and the above-mentioned decolorable agent. That is, the method for producing the decolorable material according to the embodiment includes mixing the above-mentioned colorable material and the above-mentioned decolorable agent.

The colorable material may be mixed in the form of a powder with the decolorable agent or may be mixed in the form of a dispersion liquid with the decolorable agent. Further, the decolorable agent may be mixed in the form of a powder with the colorable material, or may be mixed in the form of a solution with the colorable material, or may be mixed in the form of a dispersion liquid with the colorable material. Other one or more components may be further mixed therein.

The decolorable material can be produced by an existing method according to the form thereof, for example, whether the decolorable material is a toner or an ink except for using the above-mentioned colorable material and the above-mentioned decolorable agent.

[5] Effects

In the above-mentioned method, a first solution containing a color developable agent and a first solvent is supplied to a color developing agent in the form of a powder which is insoluble in the first solvent so that a first mixture of the first solution and the color developing agent maintains the powder state. Then, the first solvent is removed from the first mixture, thereby obtaining a powder of colorable particles containing the color developable agent and the color developing agent. Therefore, in this method, colorable particles which are less likely to cause aggregation and have a small particle diameter can be produced. Accordingly, when the thus obtained colorable particles are used as the colorable material, a high-definition image can be formed.

Further, in the method, the color developable agent can be uniformly carried on the surfaces of the color developing agent particles. Therefore, favorable coloration can be achieved with a small amount of the color developable agent.

Further, when decoloring an image formed using the colorable material obtained by the method, dissolution of the color developing agent is not needed. The decolorable agent need only be made to act only on the surfaces of the particles as the color developing agent, and therefore, decoloration can be efficiently achieved.

When the colorable particles are coated with a thermoplastic resin, undesirable decoloration of the colorable particles can be made less likely to occur.

In the above-mentioned method, when the coating of the colorable particles with the thermoplastic resin is performed by a dry method, a solution containing the thermoplastic resin and a solvent is supplied to the colorable particles in the form of a powder containing the color developable agent and the color developing agent so that the mixture of the solution and the colorable particles maintains the powder state, and the solvent is removed from the mixture. Therefore, according to the method, encapsulated particles which are less likely to cause aggregation and have a small particle diameter can be produced. Accordingly, when the thus obtained encapsulated particles are used as the colorable material, a high-definition image can be formed.

Further, according to the method, the colorable particles can be coated with the thermoplastic resin with a uniform thickness, and can be encapsulated with a small amount of the thermoplastic resin. Therefore, the decolorable agent can be made to efficiently act on the color developable agent during decoloration.

Further, when porous particles are used as the color developing agent, the color developing agent is porous and has a large specific surface area, and therefore, favorable coloration can be achieved with a small amount of the color developing agent.

The color developing agent composed of an inorganic oxide has excellent solvent resistance and heat resistance. Therefore, such a color developing agent is less likely to cause a decrease in the specific surface area or dissolution during production of the colorable material or during decoloration thereof. Further, such a color developing agent can make many hydroxy groups present on the surface thereof, and therefore, high performance can be exhibited as the color developing agent.

[6] Example of Image Forming Apparatus

The colorable material and the decolorable material described above can be used in, for example, an image forming apparatus described below.

Figure 8:
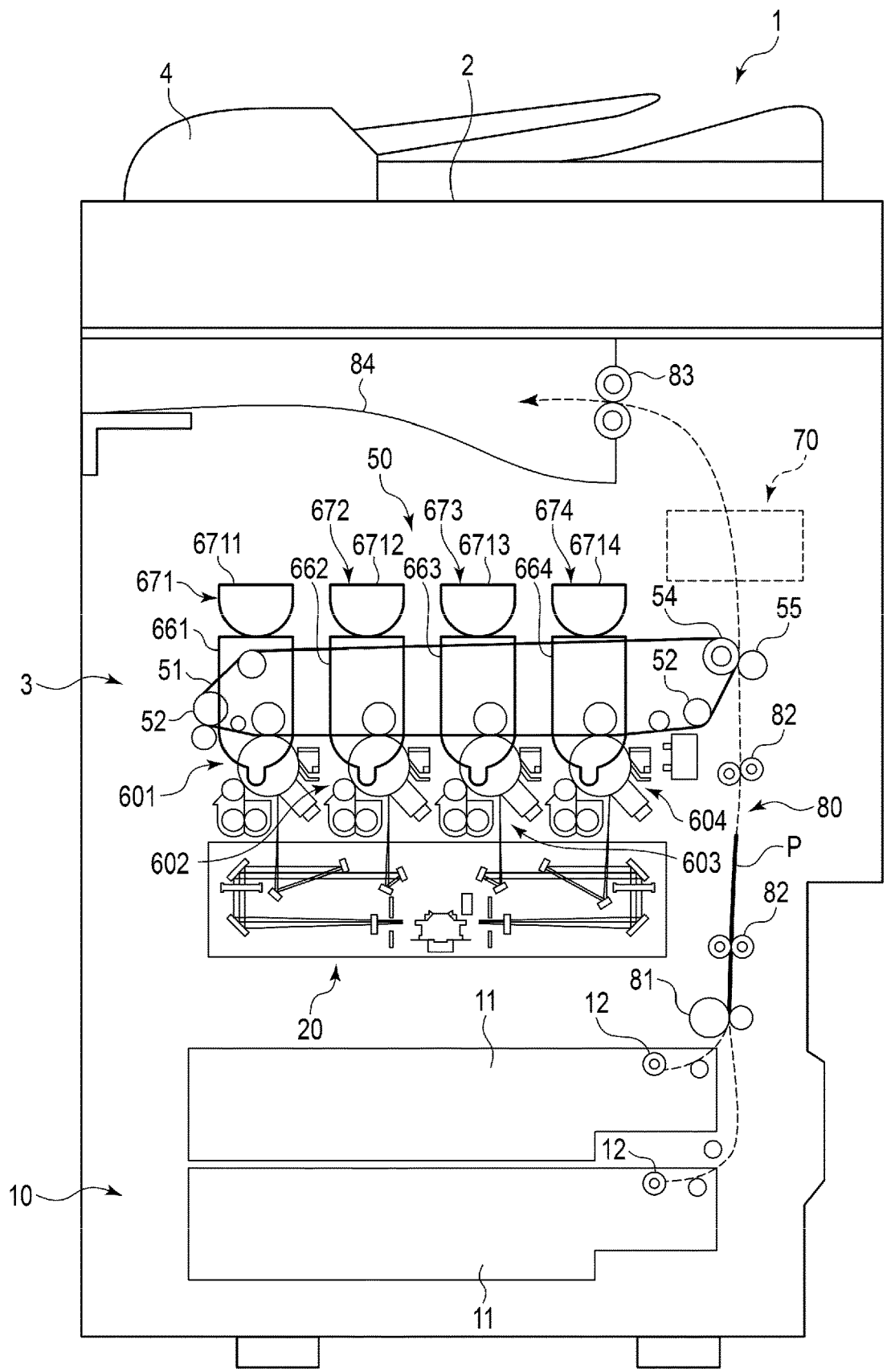
FIG. 8 is a longitudinal cross-sectional view schematically showing an example of an image forming apparatus capable of forming an image using a developer containing a colorable material or a decolorable material according to an embodiment.
Figure 9:
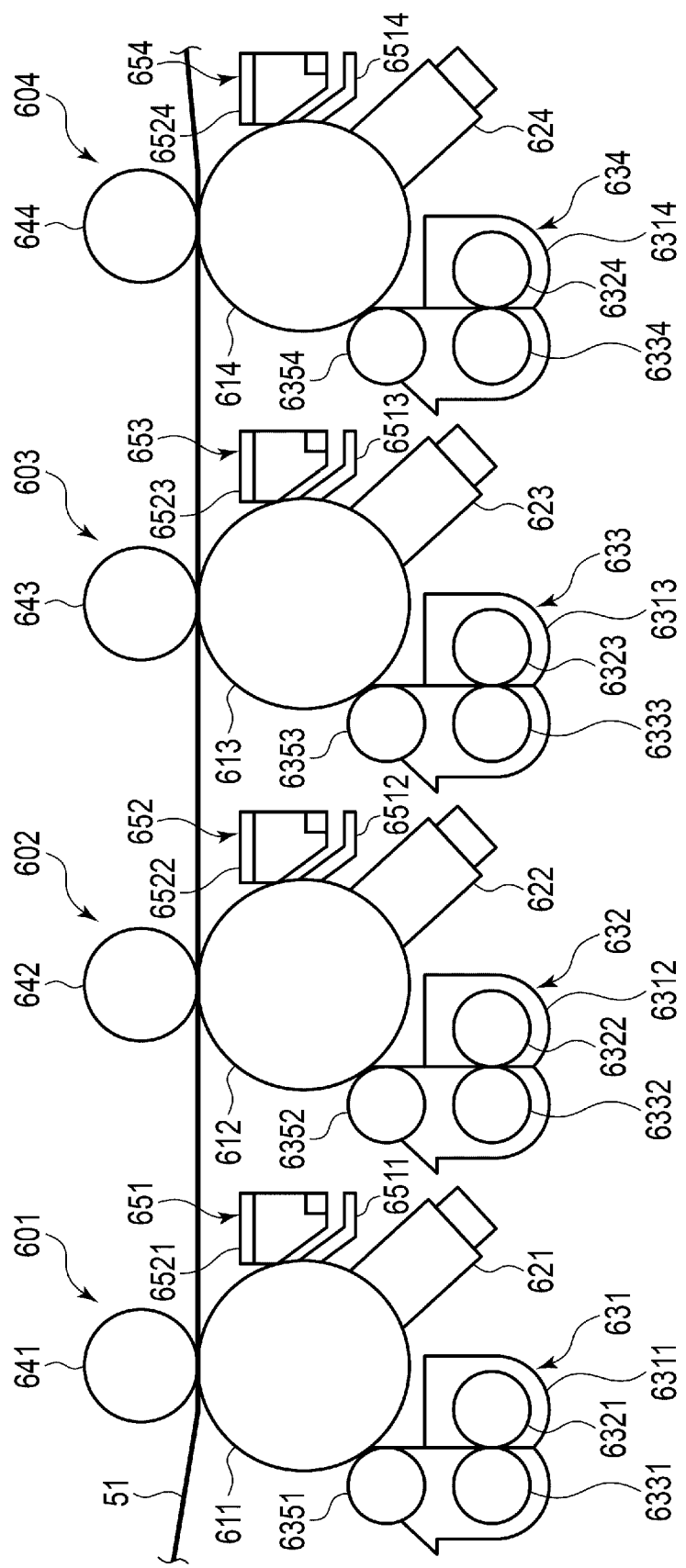
FIG. 9 is a cross-sectional view schematically showing a structure of an image forming unit.
Figure 10:
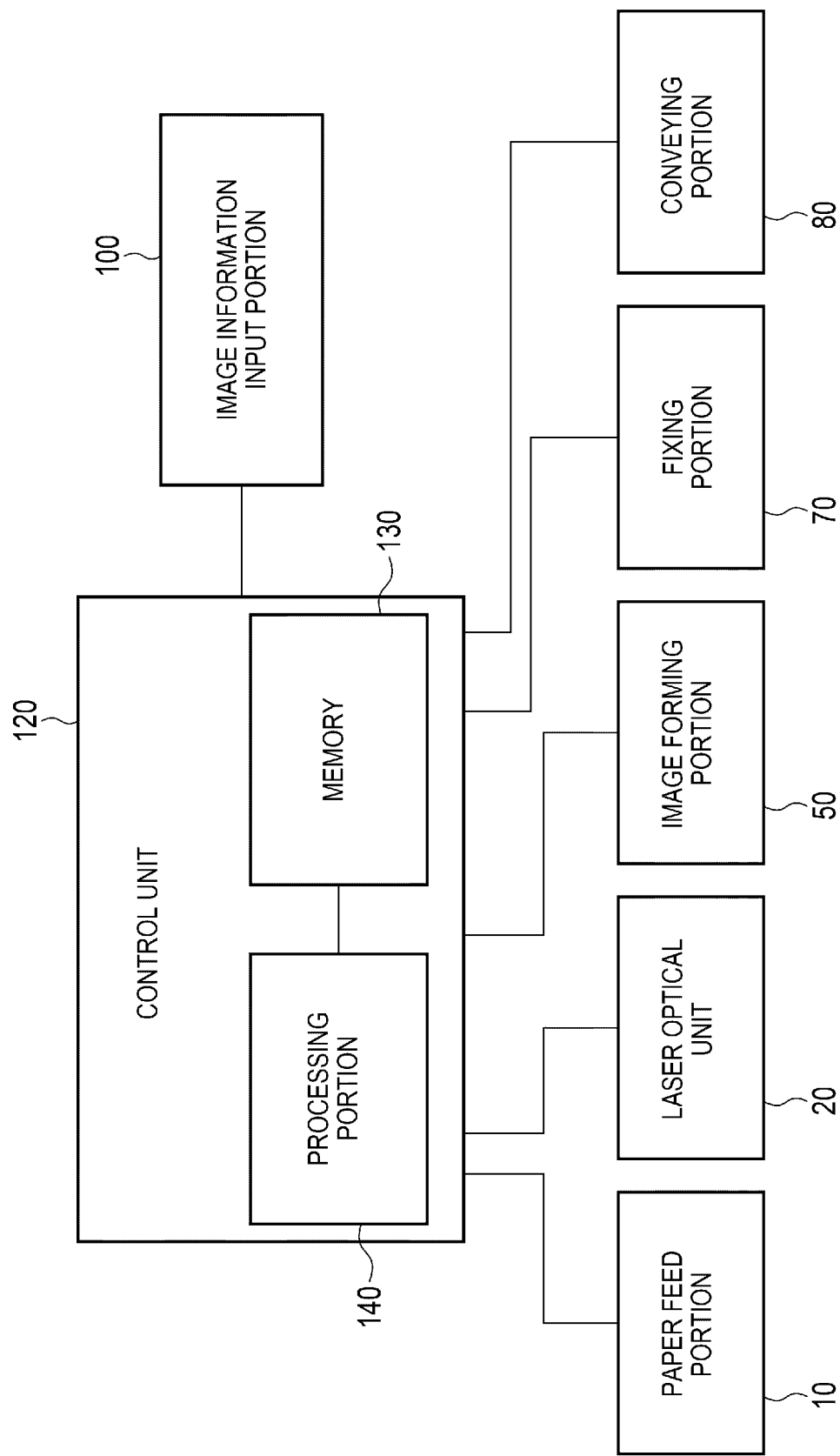
FIG. 10 is a block diagram showing a schematic configuration of a control system.

FIG. 8 is a longitudinal cross-sectional view schematically showing an example of an image forming apparatus capable of forming an image using a developer containing the colorable material or the decolorable material according to the embodiment. FIG. 9 is a cross-sectional view schematically showing a structure of an image forming unit included in the image forming apparatus shown in FIG. 8. FIG. 10 is a block diagram showing a schematic configuration of a control system of the image forming apparatus shown in FIG. 8.

An image forming apparatus 1 shown in FIG. 8 is a multi functional peripheral (MFP) capable of switching between formation of a non-decolorable color image and formation of a decolorable image. The image forming apparatus 1 includes a housing 2, a printer portion 3 disposed in the housing 2, and a scanner portion 4 disposed on an upper face of the housing 2.

The printer portion 3 forms an image on a recording medium, here, a sheet such as a paper or a resin film by electrophotography. The printer portion 3 includes a paper feed portion 10, an optical unit 20, an image forming portion 50, a fixing portion 70, a conveying portion 80, an image information input portion 100, and a control unit 120.

The paper feed portion 10 includes a plurality of paper feed cassettes 11 and a plurality of pickup rollers 12. These paper feed cassettes 11 store stacked recording media, here, sheets such as papers. The pickup roller 12 feeds a recording medium P that is the uppermost layer among the recording media stored in the paper feed cassette 11 to the image forming portion 50.

The optical unit 20 exposes the below-mentioned photoconductors 611 to 614 to light and forms electrostatic latent images on the surfaces thereof. As the optical unit 20, for example, a laser or a light emitting diode (LED) can be used.

The image forming portion 50 includes an intermediate transfer belt 51, a plurality of rollers 52, a secondary transfer roller 54, a backup roller 55, image forming units 601 to 604, hoppers 661 to 664, and toner cartridges 671 to 674. The below-mentioned primary transfer rollers 641 to 644, the intermediate transfer belt 51, the plurality of rollers 52, the secondary transfer roller 54, and the backup roller 55 constitute a transfer device.

The intermediate transfer belt 51 is one example of an intermediate transfer medium. The intermediate transfer belt 51 temporarily holds toner images formed by the image forming units 601 to 604. The plurality of rollers 52 applies a tension to the intermediate transfer belt 51. The secondary transfer roller 54 drives the intermediate transfer belt 51. Between the secondary transfer roller 54 and the backup roller 55, a portion of the intermediate transfer belt 51 is interposed. The backup roller 55 transfers the toner images formed on the intermediate transfer belt 51 to the recording medium P together with the secondary transfer roller 54.

The image forming units 601 to 604 have the same structure. That is, as shown in FIG. 9, the image forming unit 601 includes the photoconductor 611, a charger 621, a developing device 631, the primary transfer roller 641, and a cleaning unit 651. The image forming unit 602 includes the photoconductor 612, a charger 622, a developing device 632, the primary transfer roller 642, and a cleaning unit 652. The image forming unit 603 includes the photoconductor 613, a charger 623, a developing device 633, the primary transfer roller 643, and a cleaning unit 653. The image forming unit 604 includes the photoconductor 614, a charger 624, a developing device 634, the primary transfer roller 644, and a cleaning unit 654.

The photoconductors 611 to 614 are photoconductive drums here. The photoconductors 611 to 614 may be photoconductive belts. According to one example, the photoconductors 611 to 614 are organic photoconductors.

The chargers 621 to 624 apply a negative charge to the photoconductors 611 to 614, respectively, so as to negatively charge the surfaces thereof uniformly by static electricity.

The developing device 631 includes a developing container 6311, developer mixers 6321 and 6331, and a developing roller 6351. The developer mixers 6321 and 6331 stir the developer in the developing container 6311 and also supply this developer to the developing roller 6351. The developing roller 6351 supplies this developer to the photoconductor 611.

The developing device 632 includes a developing container 6312, developer mixers 6322 and 6332, and a developing roller 6352. The developer mixers 6322 and 6332 stir the developer in the developing container 6312 and also supply this developer to the developing roller 6352. The developing roller 6352 supplies this developer to the photoconductor 612.

The developing device 633 includes a developing container 6313, developer mixers 6323 and 6333, and a developing roller 6353. The developer mixers 6323 and 6333 stir the developer in the developing container 6313 and also supply this developer to the developing roller 6353. The developing roller 6353 supplies this developer to the photoconductor 613.

The developing device 634 includes a developing container 6314, developer mixers 6324 and 6334, and a developing roller 6354. The developer mixers 6324 and 6334 stir the developer in the developing container 6314 and also supply this developer to the developing roller 6354. The developing roller 6354 supplies this developer to the photoconductor 614.

The developing devices 631 to 634 supply the developer to the photoconductors 611 to 614, respectively, and form toner images corresponding to the electrostatic latent images. Here, as one example, the developer is assumed to be a two-component developer containing a toner and a carrier such as ferrite carrier. Further, here, as one example, the toners of the developing devices 631, 632, and 633 are yellow, magenta, and cyan toners, respectively, and the toner of the developing device 634 is assumed to be the above-mentioned decolorable material.

One or more of the developing devices 631 to 633 can be omitted. Further, the image forming portion 50 may further include one or more other developing devices in addition to the developing devices 631 to 634. For example, the image forming portion 50 may further include a developing device using a black toner downstream of the developing devices 631 to 633.

The primary transfer rollers 641 to 644 transfer the toner images on the photoconductors 611 to 614 to the intermediate transfer belt 51, respectively.

The cleaning units 651 to 654 remove the residue on the photoconductors 611 to 614, respectively.

The cleaning unit 651 includes a cleaning blade 6511 and a recovery tank 6521. The cleaning blade 6511 is disposed so that an edge thereof comes in contact with the surface of the photoconductor 611. A portion that comes in contact with the photoconductor 611 of the cleaning blade 6511 is composed of, for example, an organic polymer material. The cleaning blade 6511 removes the residue of the developer from the photoconductor 611 with the rotation of the photoconductor 611. The recovery tank 6521 recovers the residue removed by the cleaning blade 6511. The residue recovered in the recovery tank 6521 is discarded or reused in the developing device 631.

The cleaning unit 652 includes a cleaning blade 6512 and a recovery tank 6522. The cleaning blade 6512 is disposed so that an edge thereof comes in contact with the surface of the photoconductor 612. A portion that comes in contact with the photoconductor 612 of the cleaning blade 6512 is composed of, for example, an organic polymer material. The cleaning blade 6512 removes the residue of the developer from the photoconductor 612 with the rotation of the photoconductor 612. The recovery tank 6522 recovers the residue removed by the cleaning blade 6512. The residue recovered in the recovery tank 6522 is discarded or reused in the developing device 632.

The cleaning unit 653 includes a cleaning blade 6513 and a recovery tank 6523. The cleaning blade 6513 is disposed so that an edge thereof comes in contact with the surface of the photoconductor 613. A portion that comes in contact with the photoconductor 613 of the cleaning blade 6513 is composed of, for example, an organic polymer material. The cleaning blade 6513 removes the residue of the developer from the photoconductor 613 with the rotation of the photoconductor 613. The recovery tank 6523 recovers the residue removed by the cleaning blade 6513. The residue recovered in the recovery tank 6523 is discarded or reused in the developing device 633.

The cleaning unit 654 includes a cleaning blade 6514 and a recovery tank 6524. The cleaning blade 6514 is disposed so that an edge thereof comes in contact with the surface of the photoconductor 614. A portion that comes in contact with the photoconductor 614 of the cleaning blade 6514 is composed of, for example, an organic polymer material. The cleaning blade 6514 removes the residue of the developer from the photoconductor 614 with the rotation of the photoconductor 614. The recovery tank 6524 recovers the residue removed by the cleaning blade 6514. The residue recovered in the recovery tank 6524 is discarded or reused in the developing device 634.

The hoppers 661 to 664 are disposed above the developing devices 631 to 634, respectively. The hoppers 661 to 664 replenish the developer to the developing devices 631 to 634, respectively.

The toner cartridges 671 to 674 are detachably disposed above the hoppers 661 to 664, respectively. The toner cartridges 671 to 674 include toner cartridge bodies 6711 to 6714, respectively. Each of the toner cartridge bodies 6711 to 6714 is one example of the container and stores the developer. The toner cartridges 671 to 674 supply the developer to the hoppers 661 to 664, respectively.

The fixing portion 70 includes a heating roller, a pressurizing member, a pad, a spring, and a stopper (all not shown). The fixing portion 70 is disposed on a path for conveying the recording medium P by the conveying portion 80 and at a position between the secondary transfer roller 54 and a paper discharge roller 83.

The conveying portion 80 includes a registration roller 81, a conveying roller 82, the paper discharge roller 83, and a paper discharge tray 84. The registration roller 81 starts the conveyance of the recording medium P sent out from the pickup roller 12 to the image forming portion 50 at a predetermined timing. The conveying roller 82 conveys the recording medium P sent out from the registration roller 81 so as to pass between the backup roller 55 and the intermediate transfer belt 51 and thereafter pass through the fixing portion 70. The paper discharge roller 83 is located on the path for conveying the recording medium P and immediately upstream of the position where the recording medium P is discharged outside the printer portion 3, and conveys the recording medium P to the paper discharge tray 84. The paper discharge tray 84 is located on the upper face of the printer portion 3, and receives the discharged recording medium P.

The image information input portion 100 captures image information to be printed on the recording medium P that is a recording medium from an external recording medium or a network. The image information input portion 100 supplies this image information to the control unit 120.

The control unit 120 includes a memory 130 and a processing portion 140. The memory 130 includes, for example, a primary memory device (for example, Random Access Memory (RAM)) and a secondary memory device (for example, Read Only Memory (ROM)). The processing portion 140 includes a processor (for example, Central Processing Unit (CPU)). The secondary memory device stores, for example, a program interpreted and executed by the processor. The primary memory device primarily stores, for example, image information supplied by the image information input portion 100 or the like, the program stored in the secondary memory device, and data or the like generated through arithmetic processing by the processor. The processor interprets and executes the program stored in the primary memory device.

The control unit 120 controls the operation of the paper feed portion 10, the optical unit 20, the image forming portion 50, the fixing portion 70, the conveying portion 80, etc. based on the image information supplied from the image information input portion 100 or the like in this manner. Specifically, when an image forming mode for forming a non-decolorable color image is selected, the control unit 120 controls the operation of the image forming portion 50 so as to perform image formation by the image forming units 601 to 603 without performing image formation by the image forming unit 604. Further, when an image forming mode for forming a decolorable image is selected, the control unit 120 controls the operation of the image forming portion 50 so as to perform image formation by the image forming unit 604 without performing image formation by the image forming units 601 to 603.

The image forming apparatus 1 can be used in combination with a decoloring device. When the toner of the developing device 634 is the above-mentioned decolorable material, the decoloring device is configured to be able to heat a recording medium on which an image is formed with the decolorable material to a temperature equal to or higher than the decoloring temperature of the decolorable material. When the toner of the developing device 634 is the above-mentioned colorable material, the decoloring device is configured to supply the decolorable agent to a recording medium on which an image is formed with the colorable material and also to be able to heat the recording medium supplied with the decolorable agent to a temperature equal to or higher than the decoloring temperature of the decolorable material.

[7] Another Example of Image Forming Apparatus

The colorable material and the decolorable material described above can also be used in, for example, an image forming apparatus described below.

Figure 11:
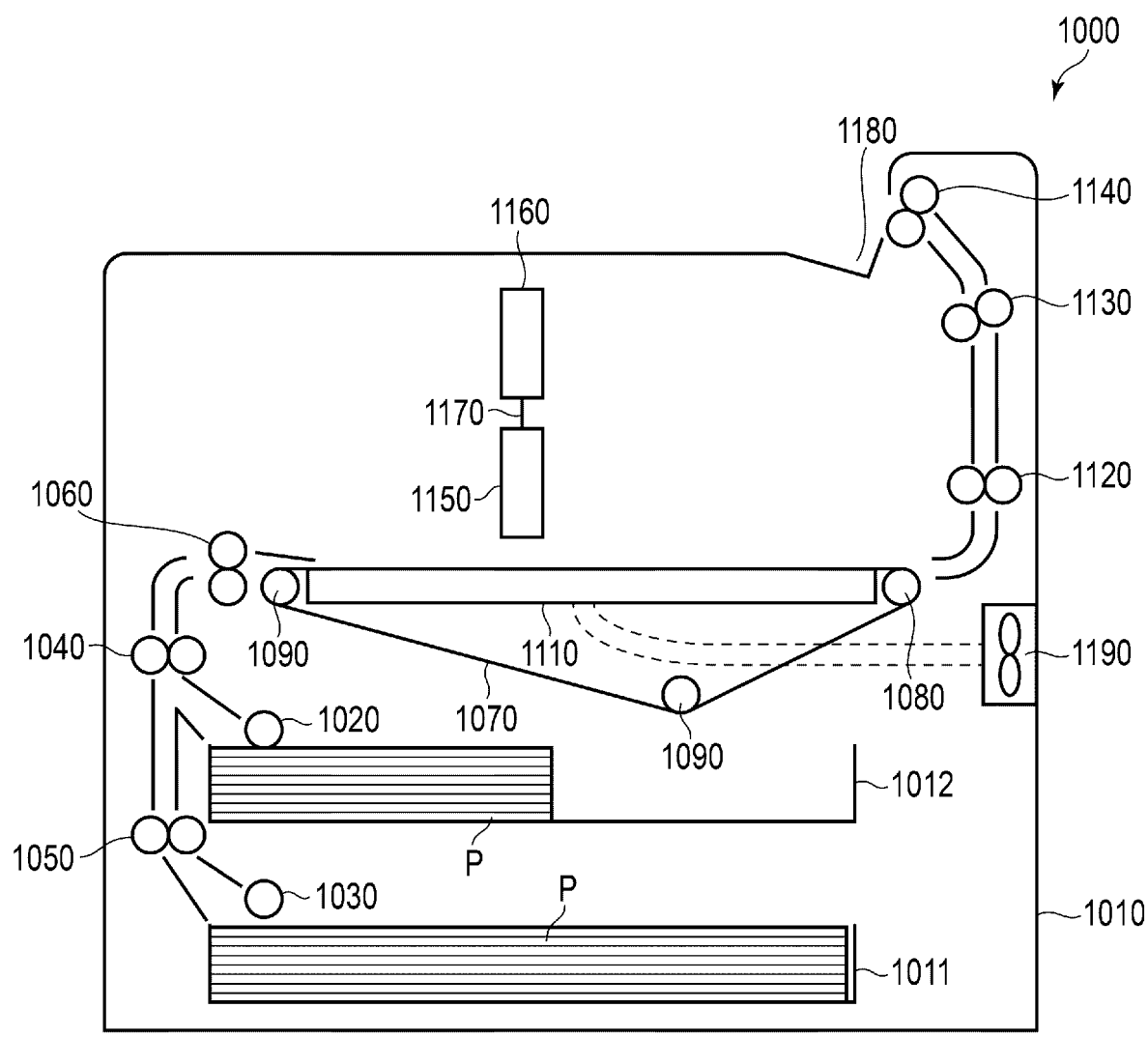
FIG. 11 is a longitudinal cross-sectional view schematically showing an example of an image forming apparatus capable of forming an image using an ink containing a colorable material according to an embodiment.

FIG. 11 is a longitudinal cross-sectional view schematically showing an example of an image forming apparatus capable of forming an image using an ink containing the colorable material or the decolorable material according to the embodiment.

An image forming apparatus 1000 shown in FIG. 11 is an inkjet printer.

The image forming apparatus 1000 includes a housing 1010, and a paper feed unit, a medium holding mechanism, an inkjet head 1150, and an ink cartridge 1160 provided in the housing 1010.

In the housing 1010, a paper discharge tray 1180 is provided. In the housing 1010, cassettes 1011 and 1012, paper feed rollers 1020 and 1030, conveying roller pairs 1040 and 1050, a registration roller pair 1060, a conveyance belt 1070, a fan 1190, a negative pressure chamber 1110, conveying roller pairs 1120, 1130, and 1140, the inkjet head 1150, the ink cartridge 1160, and a tube 1170 are disposed.

The ink cartridge 1160 includes an ink cartridge body and an ink stored in the ink cartridge body. The ink contains the above-mentioned colorable material or decolorable material, and a dispersion medium.

The cassettes 1011 and 1012 store the recording media P with different sizes. The paper feed roller 1020 or 1030 picks up the recording medium P corresponding to the selected size of the recording medium from the cassette 1011 or 1012 and conveys the recording medium P to the conveying roller pairs 1040 and 1050 and the registration roller pair 1060.

To the conveyance belt 1070, tension is applied by a driving roller 1080 and two driven rollers 1090. In the surface of the conveyance belt 1070, holes are provided at predetermined intervals. Inside the conveyance belt 1070, the negative pressure chamber 1110 connected to the fan 1190 for adsorbing the recording medium P onto the conveyance belt 1070 is disposed. Downstream in the conveyance direction of the conveyance belt 1070, the conveying roller pairs 1120, 1130, and 1140 are disposed.

Hereinafter, an image forming operation of the image forming apparatus 1000 is described.

First, an image processing unit (not shown) starts image processing for recording and generates an image signal corresponding to the image data and also generates a control signal for controlling the operation of various rollers, the negative pressure chamber 1110, and the like.

The paper feed roller 1020 or 1030 picks up the recording medium P with a selected size one by one from the cassette 1011 or 1012 under the control of the image processing unit, and conveys the recording medium P to the conveying roller pairs 1040 and 1050 and the registration roller pair 1060. The registration roller pair 1060 corrects the skew of the recording medium P and conveys the recording medium P at a predetermined timing.

The negative pressure chamber 1110 sucks air through the holes of the conveyance belt 1070. Therefore, the recording medium P is conveyed in a state of being adsorbed onto the conveyance belt 1070 to a position below the inkjet head 1150 with the movement of the conveyance belt 1070.

The inkjet head 1150 ejects the above-mentioned ink in synchronization with the timing of the conveyance of the recording medium P under the control of the image processing unit. In this manner, an image is formed at a desired position on the recording medium P.

Thereafter, the conveying roller pairs 1120, 1130, and 1140 discharge the recording medium P on which the image is formed to the paper discharge tray 1180.

The decolorable image is formed in this manner.

Heating in the drying step after ejecting the ink is not described here, however, drying by heating may be performed as long as the temperature is lower than the glass transition temperature Tg of the thermoplastic resin. Further, here, the image forming apparatus 1000 adopts a configuration capable of forming only a decolorable image. The image forming apparatus 1000 may be further provided with one or more sets of the inkjet head 1150, the ink cartridge 1160, and the tube 1170. Then, the apparatus may be configured to be able to form a non-decolorable image by the additional sets.

The image forming apparatus 1000 can also be used in combination with a decoloring device. When the ink in the ink cartridge 1160 contains the above-mentioned decolorable material, the decoloring device is configured to be able to heat a recording medium on which an image is formed with the decolorable material to a temperature equal to or higher than the decoloring temperature of the decolorable material. When the ink in the ink cartridge 1160 is the above-mentioned colorable material, the decoloring device is configured to supply the decolorable agent to a recording medium on which an image is formed with the colorable material and also to be able to heat the recording medium supplied with the decolorable agent to a temperature equal to or higher than the decoloring temperature of the decolorable material.

Examples

Hereinafter, the Examples are described.

(Production of Colorable Particles A)

In this example, colorable particles were produced by a dry method.

Specifically, a color developable agent was dissolved in acetone, thereby obtaining a color developable agent solution. As the color developable agent, crystal violet lactone (Yamada Chemical Co., Ltd., hereinafter referred to as "CVL") was used. The amount of acetone was set to 190 parts by mass with respect to 10 parts by mass of the color developable agent.

A stirring device with a turbine blade was placed so that the turbine blade was located in a flask with a volume of 2 L. To the flask, a color developing agent was fed, and a ¼ amount of the above-mentioned color developable agent solution was added dropwise thereto over 20 minutes while stirring at 3,000 rpm. As the color developing agent, Sylysia 530 (Fuji Silysia Chemical, Ltd.) that is porous silica was used. The amount of the color developing agent was set to 100 parts by mass with respect to the total amount of 10 parts by mass of the color developable agent.

With respect to the color developing agent used here, the BET specific surface area was measured using BELSORP MINI X (MicrotracBEL Corporation). As a result, the BET specific surface area was 475 $m^2/g$.

Subsequently, the flask was placed in a water bath at 50° C. and left for 1 hour while stirring at 100 rpm and also reducing the pressure inside the flask. Thereby, acetone was removed from the mixture. The color of the powder was changed from white to blue by removing acetone.

The process including dropwise addition of the color developable agent solution and removal of acetone was further performed three times, thereby allowing the color developing agent to carry the entire amount of the color developable agent. In all the processes, the color developing agent maintained the powder state during the period from the start of the dropwise addition of the color developable agent solution to the completion thereof.

In this manner, the colorable particles were obtained. Hereinafter, the colorable particles are referred to as "colorable particles A".

With respect to the colorable particles A, the average particle diameter was measured using SALD-7000 (Shimadzu Corporation). As a result, the average particle diameter was 2.9 μm.

(Production of Colorable Particles B)

In this example, colorable particles were produced by a dry method.

Specifically, the colorable particles were produced in the same manner as described for the colorable particles A except for the following point. That is, here, the amount of acetone and the amount of the color developing agent were set to 140 parts by mass and 100 parts by mass, respectively, with respect to 7 parts by mass of the color developable agent. In all the processes each including dropwise addition of the color developable agent solution and removal of acetone, the color developing agent maintained the powder state during the period from the start of the dropwise addition of the color developable agent solution to the completion thereof. Hereinafter, the colorable particles are referred to as "colorable particles B".

With respect to the colorable particles B, the average particle diameter was measured using SALD-7000 (Shimadzu Corporation). As a result, the average particle diameter was 2.8 μm.

(Production of Colorable Particles C)

In this example, colorable particles were produced by a dry method.

Specifically, the colorable particles were produced in the same manner as described for the colorable particles A except for the following point. That is, here, as the color developing agent, QSG-170 (Shin-Etsu Silicone Co., Ltd.) that is monodispersed silica was used in place of Sylysia 530 (Fuji Silysia Chemical, Ltd.).

With respect to the color developing agent used here, the BET specific surface area was measured using BELSORP MINI X (MicrotracBEL Corporation). As a result, the BET specific surface area was 16 $m^2/g$.

Also in this example, in all the processes each including dropwise addition of the color developable agent solution and removal of acetone, the color developing agent maintained the powder state during the period from the start of the dropwise addition of the color developable agent solution to the completion thereof. Hereinafter, the colorable particles are referred to as "colorable particles C".

With respect to the colorable particles C, the average particle diameter was measured using SALD-7000 (Shimadzu Corporation). As a result, the average particle diameter was 5 μm.

(Production of Colorable Particles D)

In this example, colorable particles were produced by a dry method.

Specifically, the colorable particles were produced in the same manner as described for the colorable particles C except for the following point. That is, here, the amount of acetone and the amount of the color developing agent were set to 190 parts by mass and 100 parts by mass, respectively, with respect to 5 parts by mass of the color developable agent. In all the processes each including dropwise addition of the color developable agent solution and removal of acetone, the color developing agent maintained the powder state during the period from the start of the dropwise addition of the color developable agent solution to the completion thereof. Hereinafter, the colorable particles are referred to as "colorable particles D".

With respect to the colorable particles D, the average particle diameter was measured using SALD-7000 (Shimadzu Corporation). As a result, the average particle diameter was 4 μm.

(Production of Colorable Particles E)

In this example, colorable particles were produced by a wet method.

Specifically, in an eggplant-shaped flask, a mixed liquid of a color developable agent, a color developing agent, and acetone was stirred. As the color developable agent, CVL was used, and as the color developing agent, ethyl gallate was used. The amount of the color developing agent and the amount of acetone were set to 20 parts by mass and 190 parts by mass, respectively, with respect to 10 parts by mass of the color developable agent.

Subsequently, acetone was removed from the mixed liquid using a rotary evaporator, thereby obtaining a solid material. The solid material was ground using a mixer, thereby obtaining colorable particles. Hereinafter, the colorable particles are referred to as "colorable particles E". The colorable particles E were not fine particles, and therefore, the measurement of the average particle diameter was not performed.

(Production of Colorable Particles F)

In this example, colorable particles were produced by a wet method.

Specifically, in an eggplant-shaped flask, a mixed liquid of a color developable agent, a color developing agent, and acetone was stirred. As the color developable agent, CVL was used, and as the color developing agent, Sylysia 530 (Fuji Silysia Chemical, Ltd.) was used. The amount of the color developing agent and the amount of acetone were set to 100 parts by mass and 800 parts by mass, respectively, with respect to 10 parts by mass of the color developable agent.

Subsequently, acetone was removed from the mixed liquid using a rotary evaporator, thereby obtaining a solid material. The solid material was ground using a mixer, thereby obtaining colorable particles. Hereinafter, the colorable particles are referred to as "colorable particles F".

With respect to the colorable particles F, the average particle diameter was measured using SALD-7000 (Shimadzu Corporation). As a result, the average particle diameter was 11 μm.

(Production of Colorable Particles G)

In this example, colorable particles were produced by a wet method.

Specifically, the colorable particles were produced in the same manner as described for the colorable particles F except for the following point. That is, here, the amount of acetone and the amount of the color developing agent were set to 100 parts by mass and 800 parts by mass, respectively, with respect to 7 parts by mass of the color developable agent. Hereinafter, the colorable particles are referred to as "colorable particles G".

With respect to the colorable particles G, the average particle diameter was measured using SALD-7000 (Shimadzu Corporation). As a result, the average particle diameter was 10 μm.

(Evaluation of Colorable Particles)

6 parts by mass of the colorable particles A, 0.5 parts by mass of NEOPELEX (registered trademark) G25 (Kao Corporation), and 33.5 parts by mass of ion exchanged water were mixed, thereby obtaining an ink. The ink was applied to a paper using a hand coater (RK Print Coat Instruments Ltd.). Then, after drying, the image density was measured. Further, a decolorable agent solution obtained by mixing xylitol as the decolorable agent and water was applied using the hand coater onto the image resulting from application of the ink, thereby decoloring the image. Then, after drying, the image density was measured. The amount of the decolorable agent was set to 2 parts by mass with respect to 8 parts by mass of water. For the measurement of the image density, eXact (X-Rite, Inc.) was used.

With respect also to the colorable particles B to D, and F and G, the image density was measured in the same manner as described above. The results are shown in Table 1.

where the BET specific surface area of the color developing agent is small. Then, when the BET specific surface area of the color developing agent is large, even if the amount of the color developable agent is small, a sufficiently high image density during coloration could be achieved.

(Production of Colorable Material I)

In this example, a colorable material was produced by a dry method.

Specifically, a thermoplastic resin was dissolved in acetone, thereby obtaining an encapsulating agent solution. As the thermoplastic resin, a polyester resin (PES) was used. The amount of acetone was set to 345 parts by mass with respect to 30 parts by mass of the thermoplastic resin.

A stirring device with a full-zone blade was placed so that the full-zone blade was located in a flask with a volume of 2 L. To the flask, the colorable particles A were fed, and a ⅕ amount of the above-mentioned encapsulating agent solution was added dropwise thereto over 20 minutes while stirring at 3,000 rpm. The amount of the colorable particles A was set to 60 parts by mass with respect to the total amount of 30 parts by mass of the thermoplastic resin.

Subsequently, the flask was placed in a water bath at 50° C. and left for 1 hour while stirring at 100 rpm and also reducing the pressure inside the flask. Thereby, acetone was removed from the mixture.

The process including dropwise addition of the encapsulating agent solution and removal of acetone was further performed four times, thereby allowing the colorable particles A to carry the entire amount of the thermoplastic resin. In all the processes, the colorable particles A maintained the powder state during the period from the start of the dropwise addition of the encapsulating agent solution to the completion thereof.

In this manner, the colorable material was obtained. Hereinafter, the colorable material is referred to as "colorable material I".

With respect to the colorable material I, the average particle diameter was measured using SALD-7000 (Shimadzu Corporation). As a result, the average particle diameter was 3.1 μm.

| Colorable particles | Production method | Color developable agent Type | Color developable agent Amount | Color developing agent Type | Color developing agent Specific surface area ($m^2$/g) | Color developing agent Amount | Acetone Amount | Average particle diameter (μm) | Image density during coloration | Image density during decoloration |
|---|---|---|---|---|---|---|---|---|---|---|
| A | dry method | CVL | 10 | porous silica | 475 | 100 | 190 | 2.9 | 1.1 | 0.1 |
| B | dry method | CVL | 7 | porous silica | 475 | 100 | 140 | 2.8 | 0.9 | 0.1 |
| C | dry method | CVL | 10 | monodispersed silica | 16 | 100 | 190 | 5 | 0.3 | 0.1 |
| D | dry method | CVL | 5 | monodispersed silica | 16 | 100 | 190 | 4 | 0.2 | 0.1 |
| E | dry method | CVL | 10 | ethyl gallate | — | 20 | 190 | — | — | — |
| F | dry method | CVL | 10 | porous silica | 475 | 100 | 800 | 11 | 0.9 | 0.1 |
| G | dry method | CVL | 7 | porous silica | 475 | 100 | 800 | 10 | 0.7 | 0.1 |

As shown in Table 1, according to the dry method, the colorable particles having a smaller average particle diameter could be obtained as compared with the wet method. Further, when the BET specific surface area of the color developing agent is large, a higher image density during coloration could be achieved as compared with the case (Production of Colorable Material II)

In this example, a colorable material was produced by a wet method.

Specifically, a thermoplastic resin was dissolved in acetone, thereby obtaining an encapsulating agent solution. As the thermoplastic resin, a polyester resin was used. The amount of acetone was set to 345 parts by mass with respect to 30 parts by mass of the thermoplastic resin.

Subsequently, in an eggplant-shaped flask, a mixed liquid of the colorable particles F and acetone was stirred. The amount of the colorable particles F and the amount of acetone were set to 60 parts by mass and 400 parts by mass, respectively, with respect to 30 parts by mass of the thermoplastic resin. To the mixed liquid, the above-mentioned encapsulating agent solution was added, followed by further stirring.

Subsequently, acetone was removed from the mixed liquid using a rotary evaporator, thereby obtaining a solid material. The solid material was ground using a mixer, thereby obtaining a colorable material. Hereinafter, the colorable material is referred to as "colorable material II".

With respect to the colorable material II, the average particle diameter was measured using SALD-7000 (Shimadzu Corporation). As a result, the average particle diameter was 22 μm.

(Production of Colorable Material III)

In this example, a colorable material was produced by a wet method.

Specifically, the colorable material was produced in the same manner as described for the colorable material II except for the following point. That is, here, as the colorable particles, the colorable particles A were used in place of the colorable particles F. Hereinafter, the colorable material is referred to as "colorable material III".

With respect to the colorable material III, the average particle diameter was measured using SALD-7000 (Shimadzu Corporation). As a result, the average particle diameter was 19 μm.

(Production of Colorable Material IV)

In this example, a colorable material was produced by a dry method.

Specifically, the colorable material was produced in the same manner as described for the colorable material I except for the following point. That is, here, the amount of acetone was set to 690 parts by mass with respect to 60 parts by mass of the thermoplastic resin, and the amount of the colorable particles A was set to 60 parts by mass with respect to 60 parts by mass of the thermoplastic resin. Hereinafter, the colorable material is referred to as "colorable material IV".

With respect to the colorable material IV, the average particle diameter was measured using SALD-7000 (Shimadzu Corporation). As a result, the average particle diameter was 3.8 μm.

(Evaluation of Colorable Material)

6 parts by mass of the colorable material I, 0.5 parts by mass of NEOPELEX (registered trademark) G25 (Kao Corporation), and 23.5 parts by mass of ion exchanged water were mixed. In the resulting mixed liquid, xylitol that is a decolorable agent was mixed, thereby obtaining an ink. The amount of the decolorable agent was set to 10 parts by mass with respect to 6 parts by mass of the colorable material I.

The ink was applied to a paper using a hand coater (RK Print Coat Instruments Ltd.). Then, after drying, the image density was measured. Further, the paper was heated to 100° C., and the image density after heating was also measured. For the measurement of the image density, eXact (X-Rite, Inc.) was used.

With respect also to the colorable materials II to IV, the image density was measured in the same manner as described above. The results are shown in Table 2.

| Colorable material | Production method | Colorable particles | | Thermoplastic resin | | Acetone Amont | Average particle diameter (μm) | Image density during coloration | Image density during decoloration |
|---|---|---|---|---|---|---|---|---|---|
| | | Type | Amount | Type | Amount | | | | |
| I | dry method | A | 60 | — | PES | 30 | 345 | 3.1 | 0.9 | 0.1 |
| II | wet method | F | 60 | 400 | PES | 30 | 345 | 22 | 0.7 | 0.1 |
| III | wet method | A | 60 | 400 | PES | 30 | 345 | 19 | 0.6 | 0.1 |
| IV | dry method | A | 60 | — | PES | 60 | 690 | 3.8 | 0.6 | 0.3 |

As shown in Table 2, according to the dry method, the colorable particles having a smaller average particle diameter could be obtained as compared with the wet method.

Further, when the composition was the same, according to the dry method, a higher image density during coloration could be achieved as compared with the wet method.

Then, when the amount of the thermoplastic resin was increased, the thickness of the coating film increased, and the image density decreased.

Based on the above results, it is considered that according to the dry method, a coating film which is thin and has few discontinuous portions can be formed, and therefore, a high image density during coloration and a low image density during decoloration can be both achieved.

The present disclosure is not limited to the embodiments described above and can be modified variously without departing from the gist of the present disclosure in an implementation stage. Also, the respective embodiments may be appropriately combined and implemented, and combined effects are obtained in that case. Further, the embodiments described above include various inventions, and various inventions can be extracted by combinations selected from a plurality of disclosed constituent requirements. For example, even if several constituent requirements are deleted from all the constituent requirements shown in the embodiments, a configuration in which the constituent requirements are deleted can be extracted as an invention as long as the problem can be solved and the effect can be obtained.

What is claimed is:

1. A method for producing a colorable material comprising:
   supplying a first solution to a color developing agent to form a first mixture, wherein the first solution comprises a color developable agent and a first solvent, the color developing agent is in the form of a powder which is insoluble in the first solvent, and the first mixture maintains a powder state; and
   removing the first solvent from the first mixture, thereby obtaining a powder of colorable particles comprising the color developable agent and the color developing agent.

2. The method according to claim 1, further comprising:
supplying a second solution to the colorable particles to form a second mixture, wherein the second solution comprises a thermoplastic resin and a second solvent, the colorable particles are in the form of a powder, and the second mixture maintains a powder state; and
removing the second solvent from the second mixture.

3. The method of claim 1, wherein the first solvent comprises one or more of an alcohol, a glycol, a monoalkyl ether of a glycol, a dialkyl ether of a glycol, a ketone, a nitrile, an ether, an ester, an amide, a sulfoxide, an aromatic hydrocarbon, and water.

4. The method of claim 1, wherein the color developing agent is a porous particle comprising an inorganic oxide.

5. The method of claim 1, wherein the color developable agent is present in the first solution at a concentration of from between 1 to 50 mass %.

6. The method of claim 1, wherein supplying the first solution to the color developing agent is performed at a temperature between 5 to 60° C.

7. The method of claim 1, wherein removing the first solvent from the first mixture is conducted with heating at a temperature between 40 to 90° C.

8. The method of claim 2, wherein the thermoplastic resin comprises a polyester, a styrenic resins, an acrylic resin, a phenolic resin, an epoxy-based resin, an allyl phthalate-based resin, a polyamide-based resin, or a maleic acid-based resin.

9. The method of claim 2, wherein the thermoplastic resin has a glass transition temperature (Tg) of between 40 to 200° C.

10. The method of claim 2, wherein the second solvent comprises one or more of an alcohol, a glycol, a monoalkyl ether of a glycol, a dialkyl ether of a glycol, a ketone, a nitrile, an ether, an ester, an amide, a sulfoxide, an aromatic hydrocarbon, and water.

11. The method of claim 2, wherein supplying the second solution to the colorable particles is performed at a temperature between 5 to 60° C.

12. The method of claim 2, wherein removing the second solvent from the second mixture is conducted with heating at a temperature between 40 to 90° C.

13. A method for producing a colorable material comprising:
supplying a solution to colorable particles to form a mixture, wherein the solution comprises a thermoplastic resin and a solvent, the colorable particles are in the form of a powder and comprise a color developable agent and a color developing agent, and the mixture maintains a powder state; and
removing the solvent from the mixture.

14. A method for producing a decolorable material comprising:
producing the colorable material by the method according to claim 1; and
mixing the colorable material and a decolorable agent to obtain a mixture.

15. The method of claim 14, wherein the decolorable agent comprises a polyhydric alcohol, a nonionic surfactant, a cationic surfactant, or a hindered amine derivative.

* * * * *